United States Patent [19]

Todd et al.

[11] Patent Number: 5,197,513

[45] Date of Patent: Mar. 30, 1993

[54] STRATIFIED CHAMBER SYSTEM FOR RECEIVING, STORING AND DISPENSING TWO DIFFERENT DENSITY LIQUIDS

[75] Inventors: Lorin R. Todd, Atascadero; Siavash Noorafshani, Templeton, both of Calif.

[73] Assignee: San Luis Tank Piping Construction Co. Inc., Paso Robles, Calif.

[21] Appl. No.: 862,959

[22] Filed: Apr. 3, 1992

[51] Int. Cl.$^5$ ............................................. F17C 13/00
[52] U.S. Cl. ..................................... 137/592; 137/590
[58] Field of Search ......................... 137/172, 590, 592

[56] References Cited

U.S. PATENT DOCUMENTS

| | | | |
|---|---|---|---|
| 2,632,466 | 5/1953 | Ayers | 137/590 |
| 2,732,071 | 1/1956 | Crow | 137/592 X |
| 3,552,435 | 1/1971 | Andersson et al. | 137/592 |
| 3,782,416 | 1/1974 | Levin | 137/590 |
| 4,315,404 | 2/1982 | Schmitt et al. | 60/690 |
| 4,571,948 | 2/1986 | Orenstein | 137/592 X |
| 4,987,922 | 1/1991 | Andrepont et al. | 137/592 |

OTHER PUBLICATIONS

"Commercial Cool Storage Design Guide" EPRI EM-3981, Project 2-036-3 Final Report, May 1985.

Primary Examiner—John Rivell
Attorney, Agent, or Firm—Head & Johnson

[57] ABSTRACT

A system for receiving, storing and dispensing two different density liquids such as warm and cool water, the system being in the form of a tank with an enclosed upright high density liquid distributor vessel supported on the tank bottom, the liquid distributor vessel having a plurality of spaced apart openings therein and a similar enclosed low density liquid distributor vessel supported adjacent to the tank top and elevationally positioned above the high density liquid distributor with a column member of reduced diameter therebetween. A lower flow diverter is affixed to and radially extends from the high density liquid distributor vessel above the openings and, in like manner, an upper flow diverter is affixed to and radially extends from the low density liquid distributor vessel below the openings. A first conduit extends through the tank wall and to the high density liquid distributor vessel, and a second conduit extends through the tank wall and to the low density liquid distributor vessel. Cool water, being of higher density, is added to and withdrawn from the tank through the first conduit, while warm water, being of low density, is added to or withdrawn from the tank through the second conduit. The low and high density liquids are separated in the vessel by a naturally occurring thermocline that rises and falls in proportion to the quantity of warm or cool water delivered to or withdrawn from the tank.

5 Claims, 4 Drawing Sheets

STRATIFIED CHAMBER SYSTEM FOR RECEIVING, STORING AND DISPENSING TWO DIFFERENT DENSITY LIQUIDS

BACKGROUND OF THE INVENTION

Commercial cool storage design guides frequently employ stratified chamber systems that are particularly useful as a technique for shifting all or part of the electrical power requirements for generating air conditioning requirements from peak to off-peak hours. Stratified chamber systems prevent warm and cool water mixing by relying on buoyant or hydrodynamic effects rather than physical separation. Stratified chamber systems function in this manner: when cool water is introduced to a tank with warm water, a thin, naturally occurring layer of water, called a thermocline, separates the cool water from the warm water. Studies have indicated that cool water and warm water can be stored in the same vessel with a relatively thin thermocline formed therebetween if the storage and removal of the water is maintained in such a way that intermixing is reduced. It has been well established that the maintenance of a thermocline can provide effective separation of cool and warm water without the need of any type of physical separation to thereby enhance storage efficiency. Such systems are sometimes referred to as an unbaffled tank system.

For background material relating to the use and application of stratified storage systems reference may be had to a publication of Electric Power Research Institute entitled "Commercial Cool Storage Design Guide EPRI EM-3981, Project 2036-3 Final Report, May 1985". For other background material reference may be had to U.S. Pat. No. 4,315,404 which describes a cooling system for a power generating plant that employs a stratified chamber system wherein warm and cool water are received, stored and dispensed from a single vessel for use in the power plant cooling system application.

For another illustration of prior art relating to the storage of warm and cool water in a stratified system see U.S. Pat. No. 4,987,922 which issued Jan. 29, 1991. The storage tank of this system utilizes a vertical tubular column with openings at the top and bottom and with a divider plate therein separating the column into an upper portion and a lower portion with the warm water being added to or withdrawn from the tank through the column upper portion and the cool water being added to and withdrawn from the tank through the column lower portion. The apparatus in this patent, while encompassing the principle as discussed in the article entitled "Commercial Cool Storage Design Guide" as above-mentioned, has a disadvantage in that the passage of warm and cool water into and out of the vessel must take place through openings in the tubular column that are inherently of relatively small diameter compared to that of the tank and therefore higher velocities of liquid flow are encountered, thereby introducing the possibility of increased turbulence of water stored in the tank.

The present invention is concerned with an improved stratified chamber system having means for separately introducing and withdrawing warm and cool water from the interior of a vessel in a manner to reduce the possibility of turbulence and thereby minimize the possibility of intermixing the different density liquids.

SUMMARY OF THE INVENTION

This invention is a stratified chamber system for receiving, storing and dispensing two different density liquids and particularly wherein the different density liquids are warm and cool water. The expressions "warm" and "cool" are relative, but in any event, wherein relatively warm water and relatively cool water are stored in the same vessel without a physical barrier therebetween. The system is referred to as a "stratified chamber system" in that the two different density liquids are separated only by a thermocline. The elevation of the thermocline can vary in the system according to whether proportionally more or less of cool water compared to warm water is withdrawn from the system.

The stratified chamber system is in the form of a tank having a bottom, a sidewall that is typically cylindrical, and a roof. The sidewall has a high density liquid opening and a low density liquid opening therein.

An enclosed upright, typically cylindrical, high density liquid distributor vessel is supported on the tank bottom and preferably adjacent to the center of the tank. The high density liquid distributor vessel has a vertical circumferential sidewall with a plurality of spaced apart openings therein, the openings being preferably in the upper portion of the high density liquid distributor vessel.

In like manner, an enclosed upright, typically cylindrical, low density liquid distributor vessel is supported adjacent to the tank top. The low density liquid distributor vessel is elevationally positioned directly above the high density liquid distributor vessel. It also has a plurality of openings therein preferably adjacent to the vessel bottom.

A column member of reduced diameter compared to that of the liquid distributor vessels extends from the high density liquid distributor vessel to and supports the low density liquid distributor vessel. In a preferred arrangement, the stacked array formed by the high and low density liquid distributor vessels with the column therebetween functions to preform a second service, that is, to at least in part structurally support the tank top.

A lower flow diverter is affixed to and radially extends from the high density liquid distributor vessel above the opening therein. The lower flow diverter is therefore spaced from and above the tank bottom. In the preferred arrangement, the lower flow diverter is of a generally truncated conical shape and extends downwardly and outwardly to a lower edge that is spaced above the tank bottom.

In like manner, there is an upper flow diverter affixed to and radially extending from the low density liquid distributor vessel. The upper flow diverter extends below the openings in the vessel and is thus spaced from and below the tank top. The upper flow diverter is preferably of frustroconical configuration extending outwardly and upwardly.

A first conduit extends through the tank wall and communicates with the high density liquid distributor vessel, preferably in the portion thereof below the plurality of openings. A second conduit extends through the tank wall and communicates with the low density liquid distributor vessel, preferably above the plurality of openings. High density liquid, such as cool water, is added to or withdrawn from the vessel through the first conduit. In like manner, low density liquid, such as warm water, is added to or withdrawn from the vessel through the second conduit. The high density and low density liquid distributor vessels positioned within the tank permit the passage of liquid into and out of the tank with minimal turbulence to thereby minimize the disruption of the natural occurring thermocline that separates the high density and low density liquids within the vessel.

A more complete understanding of the invention will be obtained from the description of the preferred embodiment, taken in conjunction with the attached drawings.

DESCRIPTION OF THE PREFERRED EMBODIMENT

Figure 1:
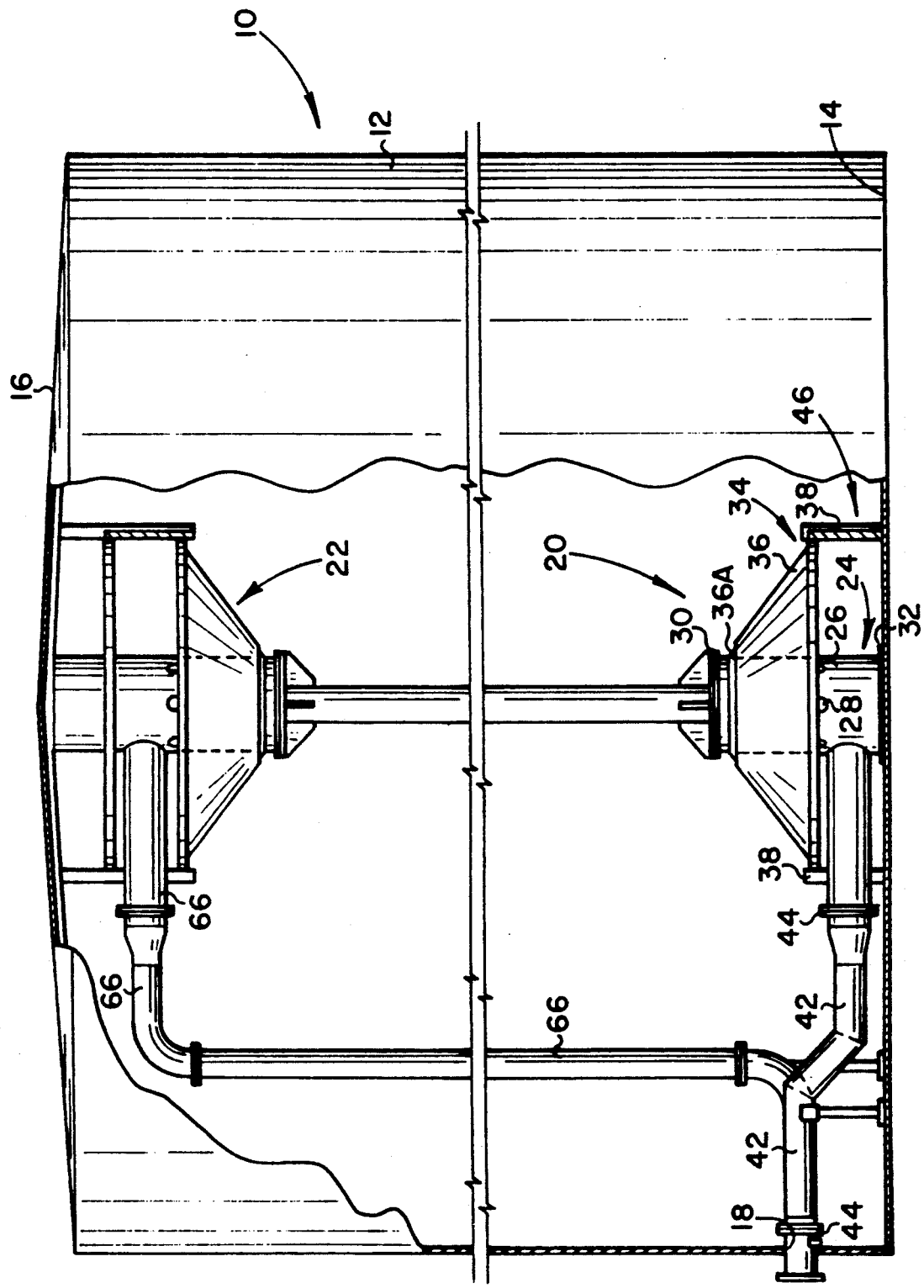
FIG. 1 is an elevational view of a stratified chamber system incorporation the principals of this invention. The stratified chamber system includes a tank shown partially cut away to show the interior arrangement of the portions of the system that are utilized for receiving, storing and dispensing two different density liquids.

Referring to the drawings and first to FIG. 1 a preferred embodiment of the system is illustrated. A stratified chamber system for receiving, storing and dispensing two different density liquids is illustrated. The system includes a tank generally indicated by the numeral 10. The tank 10 has a sidewall 12 that is typically cylindrical, a bottom 14 that rests on a pad or other support surface (not shown), and a roof 16. The tank is shown broken away as it may be of greater height in proportion to its diameter than illustrated, although the relationship between the height and diameter are not a significant feature to the invention. Tank 10 also has a high density liquid opening 18 and a corresponding low density liquid opening, not seen in FIG. 1.

The system of this invention provides means to receive, store and dispense two different density liquids. While the two different density liquids may be liquids of various kinds, a typical application of the invention is the use of tank 10 for storing warm and cool water, it being understood that the term "warm" and "cool" are relative. It is well known that the density of water varies substantially in proportion to its temperature. Warm water has a lower density than cool water. In this description the expressions "warm" and "cool" will be used to describe water having a divergence of temperatures without specific reference being made to any specific temperature that constitutes "warm" or "cool". Tank 10 can be used to simultaneously store both warm and cool water without any physical separation between them, the two different density liquids being separated by a thermocline, that is, a naturally occurring temperature differentiation that exists between liquids confined within a vessel if the liquids are of the type that vary significantly in density according to temperature, as does water.

Figure 2:
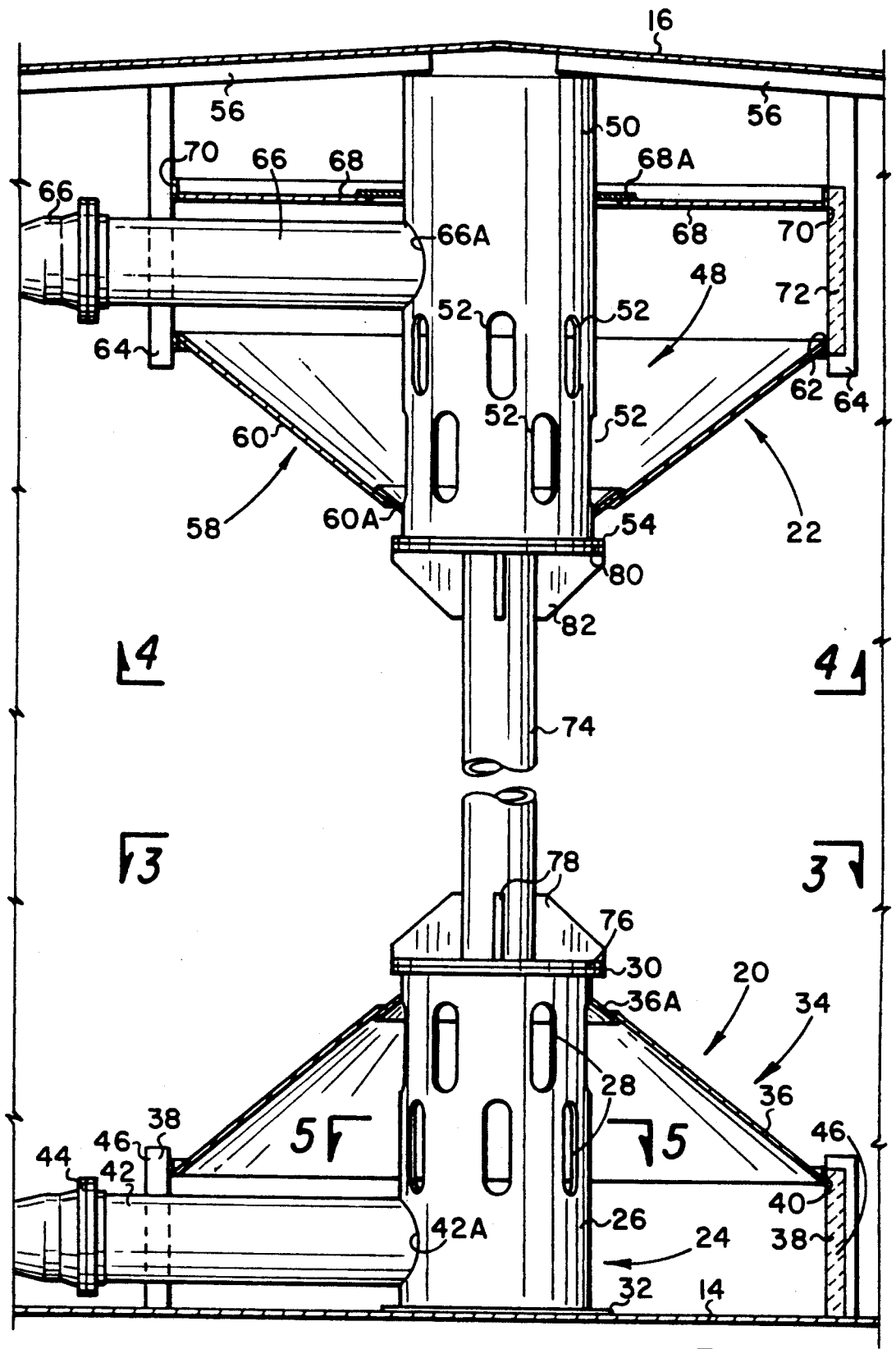
FIG. 2 is a fragmentary elevational view showing in greater detail the structure that is employed for receiving, storing and dispensing two different density liquids.

The stratified chamber system of this disclosure includes a high density receiver/dispenser portion, generally indicated by numeral 20, and a low density receiver/dispenser portion, generally indicated by numeral 22. The high density receiver/dispenser portion 20 will be first described. Portion 20 consists essentially of a closed, upright, high density liquid distributor vessel 24 that may be in the form of a relatively large diameter pipe. The vessel 24 has a vertical circumferential sidewall that is preferably cylindrical, indicated by the numeral 26, and has a plurality of spaced apart openings 28 therein (best seen in FIG. 2). As shown in FIG. 2, there are two elevational layers of spaced apart openings 28 with the openings being concentrated in the upper portion of sidewall 26.

Figure 3:
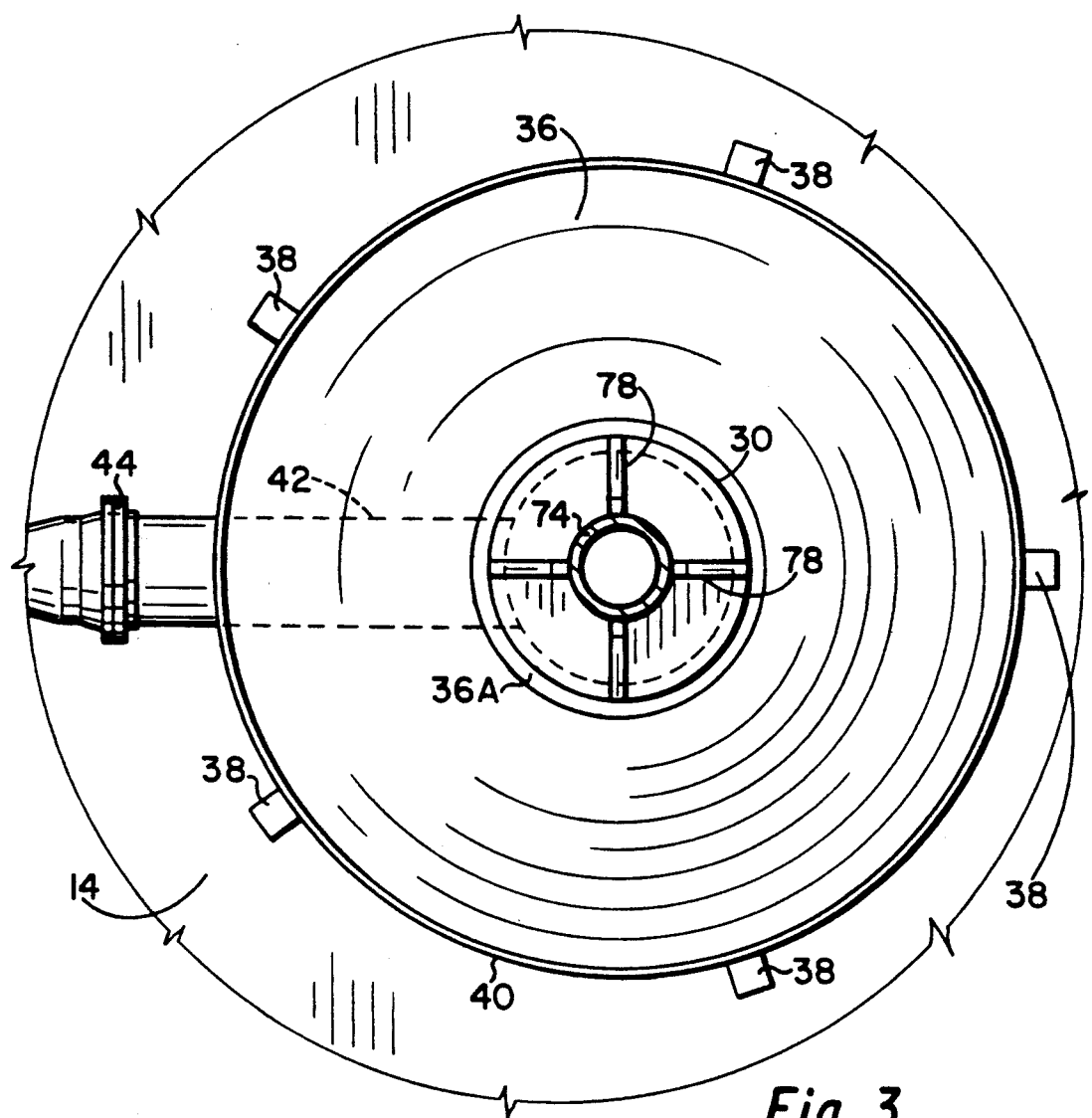
FIG. 3 is a cross-sectional view taken along the line 3—3 of FIG. 2 looking down onto the structure in the lower portion of the tank that is employed for receiving and dispensing high density liquid from the tank.

The upper end of high density liquid distributor 24 is closed by a plate 30 and the lower end is closed by a plate 32, lower plate 32 resting on tank bottom 14. Thus, high density liquid distributor vessel 24 is an enclosure that rests on tank bottom 14 and is preferably closed at both the top and bottom. A lower flow diverter 34 is affixed to and extends radially outwardly from high density liquid distributor vessel 24. In the illustrated and preferred arrangement, lower flow diverter 34 is in the form of a truncated conical shaped diverter 36 that extends downwardly and outwardly from an upper portion of high density liquid distributor vessel 24. In this illustrated arrangement the conical flow diverter includes two portions, that is the lower major portion 36 and a short portion 36A that is welded or otherwise affixed to the high density liquid distributor vessel cylindrical sidewall 26 at a position above openings 28. Structural supports 38 are spaced apart and support and stabilize the outer circumferential edge 40 of truncated conical shaped diverter 36. The structural supports 38 are spaced from each other as shown in FIG. 3, and the number of the structural supports may vary depending on the diameter of conical flow diverter 36.

A first or high density liquid conduit 42 communicates with the interior of high density liquid distributor sidewall 26, preferably in the area thereof below openings 28. As shown in FIG. 1, the first conduit 42, which may include flanges 44 as illustrated, extends through high density liquid opening 18 in tank sidewall 12.

High density liquid, cool water as an example, is dispensed into or received from the interior of tank 10 by flowage through conduit 42. When high density liquid is added to the interior of tank 12 it flows inwardly through conduit 42 and into high density liquid distributor vessel 24 where it then passes out through the plurality of openings 28. This high density liquid flow then is diverted downwardly and radially outwardly by lower flow diverter 34 and specifically by conical flow diverter 36. The relatively large diameter of the high density liquid distributor vessel 24 compared to first conduit 42 serves to reduce the velocity of liquid flow before it enters into the interior of tank 10. The arrangement of high density receiver/dispenser portion 20 provides a generally horizontal circumferential high density liquid passageway 46 between bottom edge 40 of conical flow diverter 36 and structural supports 38 so that the high density liquid is added to or withdrawn from the interior of the tank in a way to minimize turbulance that would cause intermixing with the low density liquid.

The low density receiver/dispenser portion 22 is of very similar construction to that of the high density receiver/dispenser portion 20 as described, that is, the low density receiver/dispenser portion includes a low density liquid distributor vessel, generally indicated by the numeral 48. The vessel 48 has a sidewall 50 that is preferably, as illustrated, cylindrical with a plurality of spaced apart openings 52 therein. Openings 52 are preferably in the lower portion of low density liquid distributor vessel 48.

A plate 54 closes the lower end of vessel 48. In the preferred arrangement as illustrated, the high density and low density receiver/dispenser portions 20 and 22 can be employed as a portion of a structure to support, at least in part, tank roof 16, in which case the upper end of the low density liquid distributor vessel sidewall 50 can be employed to support structurally members 56 forming a part of roof 16.

Figure 4:
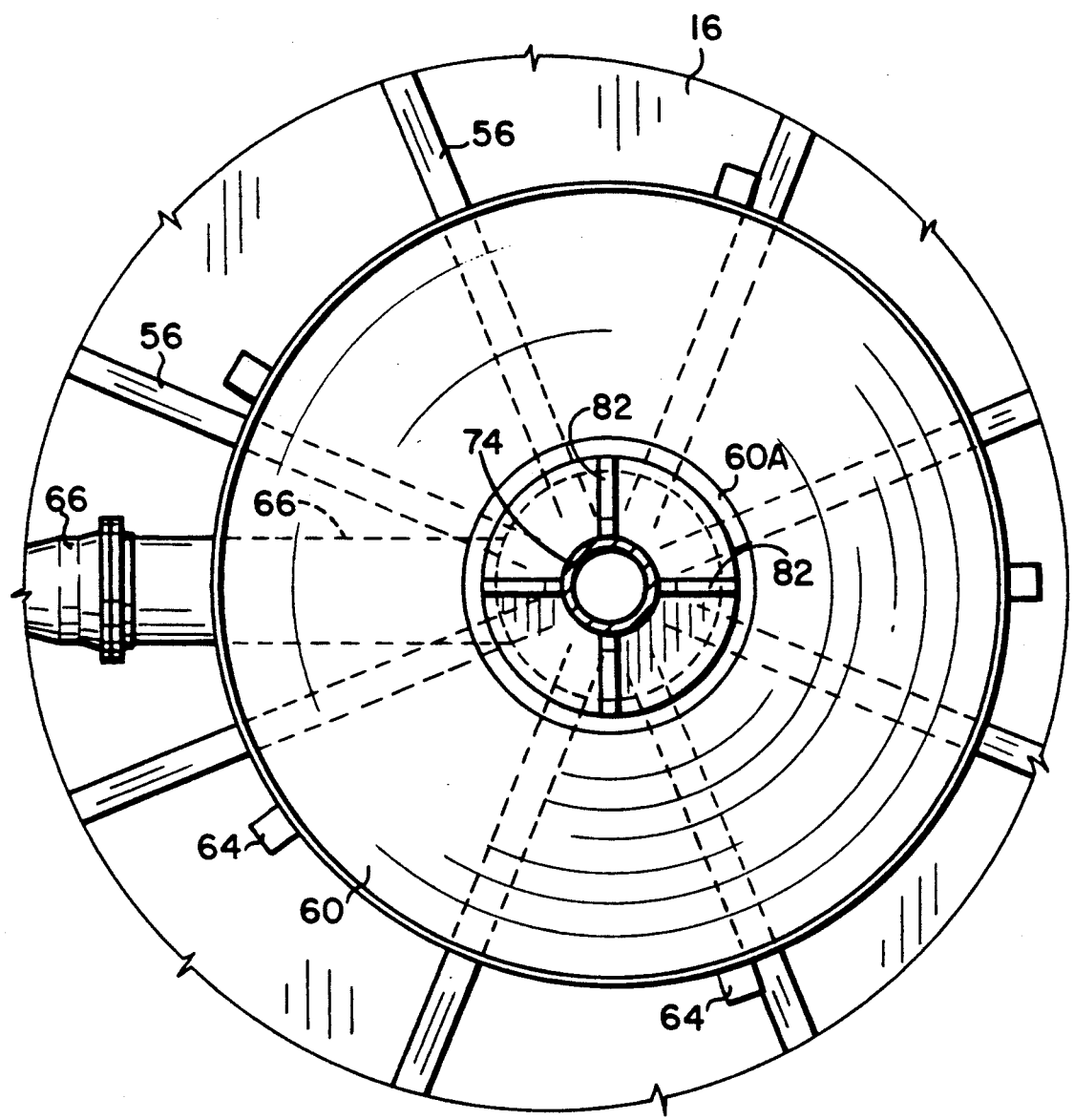
FIG. 4 is a cross-sectional view taken along the line 4—4 of FIG. 2 looking upwardly at the structure in the upper portion of the tank that is employed for receiving and dispensing low density liquid from the tank.

An upper flow diverter, generally indicated by numeral 58, is employed as a part of the low density receiver/dispenser portion 22 and preferably is, as illustrated, in the form of a frustroconical flow diverter 60. Like the lower frustroconical flow diverter, the upper diverter 60 is made in two portions, including a short length portion 60A. The conical flow diverter 60 flares upwardly and outwardly to an upper enlarged diameter circumferential edge 62. Structural supports 64 are spaced apart from each other and are comparable to lower structural supports 38. Supports 64 are attached at their tops to structural members 56 to provide support for conical flow diverter outer edge 62. The structural supports 64 are spaced apart, as shown in FIG. 4, so as not to interfere with liquid flow, the number of such structural supports being determined by the diameter of conical flow diverter 60.

A second or low density liquid conduit 66 communicates with the interior of low density liquid distributor vessel 48 at a position above openings 52. In the preferred arrangement, high density and low density liquids are dispersed into or withdrawn from the interior of the tank at the same level and adjacent to each other so that thereby the passage of the low density conduit 66 through wall 12 of the vessel as seen in FIG. 1 is obscured by the high density liquid conduit 42 but conduit 66 passes through the wall of the tank in the same way.

The low density receiver/dispenser portion 22 described up to this point is substantially identical to the high density receiver/dispenser portion 20 as previously described. However, the low density receiver/dispenser portion 22 has one other element not found in the high density receiver/dispenser portion 20 and that is a horizontal diverter plate 68 that is attached to and extends radially from sidewall 50 of low density liquid distributor vessel 48. In the illustrated arrangement the horizontal diverter plate is of two portions, including a smaller portion 68A to which the outer portion is affixed. The outer edge 70 of horizontal diverter plate 68 is attached to vertical structural supports 64. Horizontal diverter plate 68 provides a horizontal radially extending liquid flow passageway 72 between itself and the conical flow diverter 60.

Low density liquid enters into and is removed from the interior of tank 10 by flow through conduit 66. The liquid flows to or from the interior of the low density liquid distributor vessel 48 and through openings 52 where it is diverted upwardly by conical flow diverter 60 and then directly orizontal out into the interior of the vessel by the horizontal diverter plate 68.

Thus, the horizontal circumferential liquid flow passageway 72 channels the flow of liquid radially around a large perimeter to achieve non-turbulent flow with a minimal possibility of interrupting the thermocline which naturally establishes itself between the low density and high density liquid.

As previously stated, the low density liquid distributor vessel 48 is positioned elevationally directly above the high density liquid distributor vessel 24. This is accomplished by use of a vertical column 74. The column has a lower plate 76 that rests upon plate 30 affixed to the upper end of the high density liquid distributor vessel sidewall 26, plate 76 being secured by vertical gussets 78. An upper plate 80 is secured to the upper end of vertical column 74 to support plate 54 affixed to the low density liquid distributor vessel 48. Plate 80 is secured by gussets 82.

Figure 5:
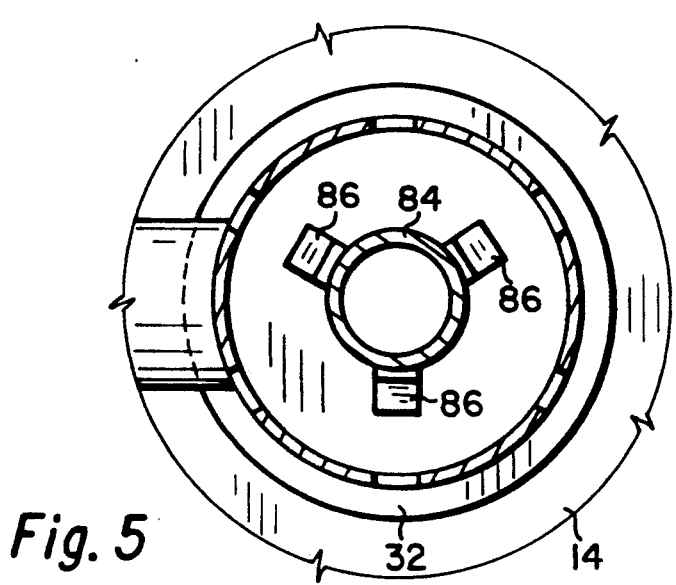
FIG. 5 is a cross-sectional view taken along the line 5—5 of FIG. 2 showing more details of construction of the high density liquid distributor vessel that is supported on the bottom of the tank and through which high density liquid is received into or dispensed from the interior of the tank.

FIG. 5 is a cross-sectional view of the high density liquid distributor vessel 24 and illustrates that there is contained internally within the vessel a cylindrical structural member 84 that is a short length of pipe. Pipe 84 extends from plate 32 to plate 30. Pipe 84 is non-liquid carrying and serves strictly as a structural member to support plates 30 and 76, vertical column 74 being directly above pipe 84. Angular clips 86 are used to secure pipe 84 in position on plate 32 that rests on tank floor 14.

Thus, a structural array is formed by the high density liquid distributor vessel 24, vertical column 74 and low density distributor vessel 48. This array can serve the ancillary function of supporting, at least in part, the weight of tank roof 16.

Vertical column 74 is conveniently constructed of a pipe as illustrated, however, column 74 does not conduct liquid and is preferably closed at its opposite ends by plates 76 and 80.

The stratified chamber system as described provides an improved arrangement for storing liquid of two different densities wherein the liquids are separated by a thermocline and not by any type of physical barrier. The system as described herein provides a method of receiving and dispensing two different density liquids from a tank in a manner to substantially reduce turbulence of the flow of liquids into and out of the tank to thereby minimize the possibility of disruption of the naturally occurring thermocline that separates the stratified different density liquids.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A stratified chamber system for receiving, storing and dispensing higher and lower density liquids comprising:

a tank having a bottom, a sidewall and a top and having a higher density liquid opening and a lower density liquid opening therein;

an enclosed upright higher density liquid distributor vessel supported by said tank bottom having a vertical circumferential sidewall with a plurality of spaced apart openings therein;

an enclosed upright lower density liquid distributor vessel supported adjacent said tank top and elevationally positioned above said higher density liquid distributor vessel;

a frustroconical lower flow diverter means supported at said higher density liquid distributor vessel and above said openings therein and extending downwardly and outwardly and having a lower circumferential edge spaced from and above said tank bottom;

an upper flow diverter means extending from said lower density liquid distributor vessel, the upper flow diverter being spaced from and below said tank top;

a first conduit connected to said tank higher density liquid opening and extending between said lower flow diverter means lower circumferential edge and said tank bottom and connected to said higher density liquid distributor vessel below said openings therein; and a second conduit connecting said tank lower density liquid opening to said lower density liquid distributor vessel, whereby higher density liquid is conveyed into said tank by liquid flow upwardly within said higher density liquid distributor and out through said openings therein and thence radially outwardly below said diverter lower circumferential edge and is withdrawn from said tank in the opposite direction, and wherein lower density liquid is conveyed into and withdrawn from said tank through said lower density liquid distributor vessel.

2. A stratified chamber system for receiving, storing and dispensing higher and lower density liquids according the claim 1 wherein said lower density liquid distributor vessel has a plurality of openings therein and wherein said upper flow diverter means is of frustroconical configuration tapering upwardly and outwardly from said lower density liquid distributor vessel and having an upper circumferential edge spaced from and below said tank top, said second conduit extending between said upper circumferential edge and said tank top to connect with said lower density liquid distributor vessel above said openings therein.

3. A stratified chamber system for receiving, storing and dispensing higher and lower density liquids according to claim 2 further including:

a horizontal diverter plate having an opening therein receiving said lower density distributor vessel and being spaced intermediate said upper flow diverter means and said tank top, said second conduit extending below said horizontal diverter plate.

4. A stratified chamber system for receiving, storing and dispensing higher and lower density liquids according to claim 3 wherein said horizontal diverter plate is of dimensions at least substantially as great as the dimensions of said upper flow diverter means and providing a generally horizontal circumferential low density liquid flow passageway between itself and said upper flow diverter means.

5. A stratified chamber system for receiving, storing and dispensing higher and lower density liquids according to claim 1 including a non-liquid column member extending from said higher density liquid distributor vessel to and supporting said lower density liquid distributor vessel and wherein said column, said higher density liquid distributor vessel and said lower density liquid distributor vessel are in axial vertical alignment and serve to, at least in part, structurally support said tank top.

* * * * *

UNITED STATES PATENT AND TRADEMARK OFFICE
CERTIFICATE OF CORRECTION

PATENT NO. : 5,197,513

DATED : March 30, 1993

INVENTOR(S) : Lorin R. Todd and Siavash Noorafshani

It is certified that error appears in the above-indentified patent and that said Letters Patent is hereby corrected as shown below:

Column 3, line 16, change "incorporation" to --incorporating--.

Column 6, line 4, change "orizontal" to --horizontally--.

Column 6, line 63, change "particularly" to --particularity--.

Signed and Sealed this

Eleventh Day of January, 1994

Attest:

BRUCE LEHMAN

*Attesting Officer*     Commissioner of Patents and Trademarks